Figure 1:
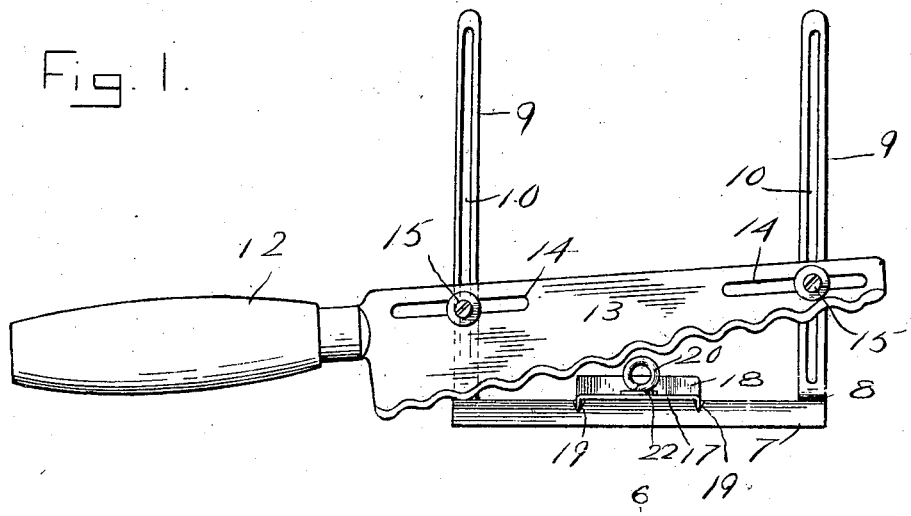

No. 861,124. PATENTED JULY 23, 1907.
W. H. KEELER.
BREAD CUTTER.
APPLICATION FILED MAR. 4, 1907.

2 SHEETS—SHEET 1.

Witnesses
J. C. Simpson
M. J. Miller

Inventor
W. H. Keeler.
By Chandler & Chandler
Attorneys

No. 861,124.

PATENTED JULY 23, 1907.

W. H. KEELER.
BREAD CUTTER.
APPLICATION FILED MAR. 4, 1907.

2 SHEETS—SHEET 2.

Witnesses
J. C. Simpson
M. T. Miller

Inventor
W. H. Keeler
By Chandler & Chandler
Attorneys

UNITED STATES PATENT OFFICE.

WILLIAM H. KEELER, OF SOUTH HAVEN, MICHIGAN.

BREAD-CUTTER.

No. 861,124.  Specification of Letters Patent.  Patented July 23, 1907.

Application filed March 4, 1907. Serial No. 360,396.

*To all whom it may concern:*

Be it known that I, WILLIAM H. KEELER, a citizen of the United States, residing at South Haven, in the county of Van Buren, State of Michigan, have invented certain new and useful Improvements in Bread-Cutters; and I do hereby declare the following to be a full, clear, and exact description of the invention, such as will enable others skilled in the art to which it appertains to make and use the same.
The present invention has reference to improvements in bread cutters, and it aims to provide an exceedingly simple, inexpensive, and highly efficient device of that nature including a knife carried by a pair of slotted standards and adapted for a saw-like reciprocatory movement thereacross, the knife being so arranged upon the standards that its cutting edge can, at no time, contact with the base plate upon which the standards are mounted, so that any possibility of the knife edge becoming dulled from such contact is positively prevented.

A further improvement consists in the provision of a gage, so mounted upon the base plate as to be capable of movement towards and from the knife-carrying standards, whereby the thickness of the slices to be cut may be regulated at will, the gage being so disposed that its vertical shoulder is at all times exactly parallel with the knife, so as to insure uniform thickness in the sliced bread.

The invention will be readily understood from the following detailed description, and its preferred embodiment is illustrated in the accompanying drawings, in which like parts are designated by corresponding reference numerals in the several views.

Figure 2:
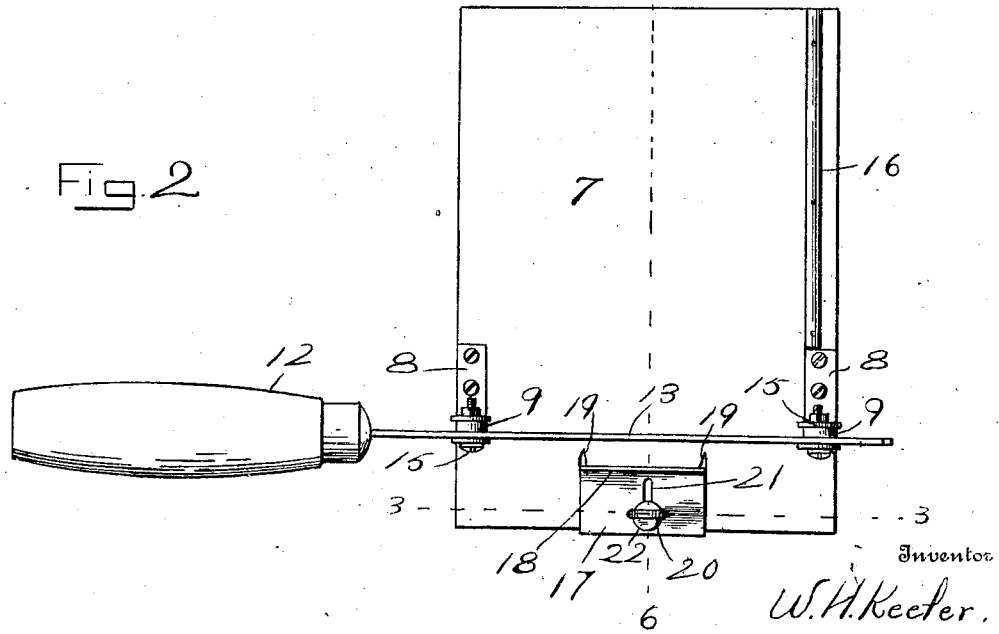
Figure 3:
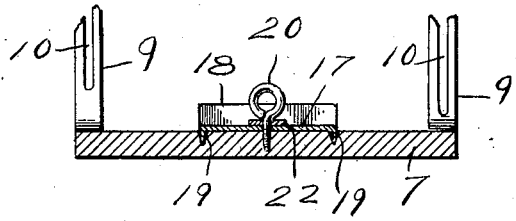
Figure 4:
Figure 5:
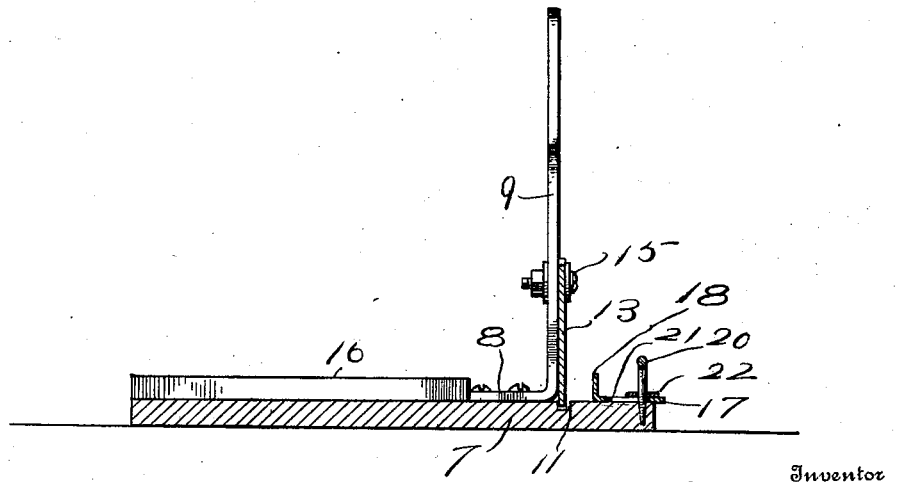

Of the said drawings—Figure 1 is a front view of the improved bread slicer. Fig. 2 is a top plan view. Fig. 3 is a transverse vertical section taken on the line 3—3 of Fig. 2. Fig. 4 is a detail view of a knife used in slicing meat and vegetables. Fig. 5 is a longitudinal section taken on the line 6—6 of Fig. 2, the knife being shown in its lowermost position.

Referring more particularly to the drawings, the device is shown as including a base-plate 7, to the upper face of which the feet 8 of a pair of vertical uprights 9 are bolted, the uprights being disposed towards the front end of the base-plate and in alinement with each other. Each upright, which, as shown, is formed of a strip of flat steel, is provided with a longitudinal slot 10 formed through the front and rear faces thereof, the lower end of which stops short a slight distance from the base-plate. The base-plate itself is further provided with a kerf 11, disposed transversely thereof and lying in the same vertical plane as the front face of the uprights.

The uprights themselves carry a knife 12, disposed transversely thereof, the blade 13 of which is provided at opposite ends with a pair of longitudinal slots 14, arranged in alinement with each other, each of said slots intersecting the slot 10 of the corresponding upright, approximately at right angles. Through each pair of intersecting slots extends a fastening device 15, comprising a headed bolt and a pair of washers, by means of which the knife is fastened to the uprights.

Owing to the disposition of the slots 10 and 14, above referred to, it will be apparent that the knife may be moved backwards and forwards across the face of the uprights, and may be moved at the same time towards the base-plate, or, in other words, the movement of the blade is similar to that of a saw, thus effecting the necessary shear cut.

In its lowermost position, the knife blade extends partway into the kerf 11, the depth of which, however, is sufficiently great to prevent the cutting edge of the blade from contacting with its bottom, thus obviating any possibility of the cutting edge becoming dulled by such contact.

Where the device is adapted for use as a bread-cutter, the blade 13 is preferably of the Christy type, as shown in Fig. 1, its cutting edge being waved, while in Fig. 4 the blade is of the type used by butchers in slicing meat. In both instances, however, since the blade tapers toward its far end, the slot of the corresponding upright extends somewhat below that of the opposite upright, as shown.

Mounted upon the upper face of the base-plate in the rear of one of the uprights is a longitudinal rib 16, which forms a guide for the passage of the material to be sliced, the inner face of said rib lying in the same vertical plane as that of the upright to which it is adjacent.

Disposed in advance of the blade 13 is a gage 17, which is disposed transversely of the base-plate, the inner edge of the gage being bent upwardly to form a shoulder 18, which extends parallel with the blade. The gage is movable bodily towards and from the blade to regulate the thickness of the slices to be cut, and to this end the side edges of the gage are bent downwardly and are disposed within longitudinal slots 19 formed in the upper face of the base-plate, the gage being retained in an adjusted position by means of a thumb-screw 20, which works through a slot 21 formed through the gage, said thumb-screw including a flared or collar portion 22, which, when the thumb-screw is tightened, impinges against the upper face of the gage.

Owing to the fact that the depending side edges of the gage fit in the slots 19, which latter are directly at right-angles to the knife-blade, the shoulder portion 18 will extend parallel with the cutting blade so as to effect uniform thickness in each slice cut.

While the device is adapted primarily for use as a bread cutter, it is to be understood that it may be used with equal readiness in slicing meat or vegetables.

What is claimed, is—

1. The combination, in a device of the class described, of a base-plate; a pair of spaced alining uprights secured thereto adjacent one end, each upright having a longitudinal slot formed through the front and rear faces thereof; a cutting blade slidably carried by said uprights and disposed transversely with respect thereto, said blade being provided at opposite ends with a pair of longitudinal alining slots, each of said last-mentioned slots intersecting the slot of the corresponding upright approximately at right angles whereby said blade may be moved downwardly towards said base-plate and reciprocated endwise across said uprights simultaneously; and a fastening device extending through each pair of intersecting slots, to attach said blade to said uprights.

2. The combination, in a device of the class described, of a base-plate; a pair of spaced alining uprights mounted thereon adjacent one end, each upright being provided with a longitudinal slot; a cutting blade slidably carried by said uprights and disposed transversely with respect thereto, said blade being provided at opposite ends with a pair of longitudinal alining slots, each of said last-mentioned slots intersecting the slot of the corresponding upright approximately at right angles whereby said blade may be moved downwardly towards said base-plate and reciprocated endwise across said uprights simultaneously; a fastening device extending through each pair of intersecting slots, to attach said blade to said uprights; a longitudinal guide rib disposed on the upper face of said base-plate in the rear of one of said uprights; a gage plate slidable bodily upon the upper face of said base-plate in advance of said uprights towards and away from said knife, said plate including a vertical shoulder disposed parallel with the blade of the knife; and means for retaining said gage plate in adjusted position.

In tesimony whereof, I affix my signature, in presence of two witnesses.

WILLIAM H. KEELER.

Witnesses:
F. C. COGSHALL,
GEO. H. WYHAM.